US007294160B2

United States Patent
Hunsinger

(10) Patent No.: US 7,294,160 B2
(45) Date of Patent: Nov. 13, 2007

(54) AIR CLEANER

(75) Inventor: Gary Hunsinger, Rochester, NY (US)

(73) Assignee: Shawndra Products, Inc., Lima, NY (US)

( * ) Notice: Subject to any disclaimer, the term of this patent is extended or adjusted under 35 U.S.C. 154(b) by 140 days.

(21) Appl. No.: 10/809,027

(22) Filed: Mar. 25, 2004

(65) Prior Publication Data
US 2005/0211094 A1    Sep. 29, 2005

(51) Int. Cl.
*B01D 46/00*    (2006.01)
(52) U.S. Cl. .......................... 55/497; 55/498; 55/500;
55/501; 55/502; 55/521; 210/232; 210/243;
210/461; 210/489; 210/493.2; 210/497.01
(58) Field of Classification Search ................ 55/497,
55/498, 500, 502, 521, 505, 513, 511; 210/232,
210/243, 461, 489, 493.2, 497.01
See application file for complete search history.

(56) References Cited

U.S. PATENT DOCUMENTS

| 2,539,378 | A | * | 1/1951 | Stootman ..................... 55/505 |
| 3,722,186 | A | * | 3/1973 | Parker et al. ................. 55/304 |
| 4,350,509 | A | * | 9/1982 | Alseth et al. ................. 55/337 |
| 5,112,372 | A | * | 5/1992 | Boeckermann et al. ....... 96/388 |
| 5,275,636 | A | * | 1/1994 | Dudley et al. ................ 96/421 |
| 5,431,706 | A | * | 7/1995 | Paas ............................ 55/342 |
| 5,509,948 | A | * | 4/1996 | Keller et al. .................. 55/337 |
| 5,919,279 | A | * | 7/1999 | Merritt et al. ............. 55/385.3 |
| 5,935,281 | A | * | 8/1999 | Rotheiser et al. .......... 55/385.3 |
| 6,096,207 | A | * | 8/2000 | Hoffman et al. ............ 210/232 |
| 6,103,119 | A | * | 8/2000 | Clements et al. ........ 210/493.1 |
| 6,110,248 | A | * | 8/2000 | Liu ............................. 55/490 |
| RE37,150 | E | * | 5/2001 | Anonychuk ................ 55/385.3 |
| 6,361,574 | B1 | | 3/2002 | Decker |
| 6,447,565 | B1 | * | 9/2002 | Raszkowski et al. ...... 55/385.4 |
| 6,610,116 | B1 | * | 8/2003 | Avery ........................ 55/385.1 |
| 6,991,112 | B2 | * | 1/2006 | Ham .......................... 210/450 |
| 2003/0066424 | A1 | * | 4/2003 | Shah et al. ................... 95/273 |
| 2005/0072302 | A1 | * | 4/2005 | Miller et al. ................. 95/273 |

* cited by examiner

*Primary Examiner*—Duane Smith
*Assistant Examiner*—Minh-Chau T. Pham
(74) *Attorney, Agent, or Firm*—Hoffman, Warnick & D'Alessandro LLC

(57) ABSTRACT

The present invention comprises concerns a novel air cleaner having an inner mesh barrier. This inner mesh barrier has a plurality of openings, and is generally cylindrical, having an inner mesh barrier liner surface, and an inner mesh barrier outer surface. Furthermore, the air filter has an upper retaining segment and a lower retaining segment, and a filtration means. Furthermore, the lower retaining segment of the air filter has an outer surface having an integral coupling means protruding outward there from. The integral coupling means of the present invention is generally molded from the same material as the lower segment of the air filter. Furthermore, the integral coupling means has an inner surface and an outer surface, wherein said outer surface of said integral coupling means has a plurality of threads for thereby attaching the air filter to a suitable device.

8 Claims, 4 Drawing Sheets

AIR CLEANER

TECHNICAL FIELD

The present invention relates generally to an air cleaner and, more particularly, to an air intake filter having an integral coupling means supported by an essential component.

BACKGROUND

In order to prevent damage to devices requiring air, it is necessary to filter or pre-clean the air flowing to those devices. Currently, air cleaning assemblies or air pre-cleaners, for removal and discharge of particulates from the intake air, are mounted in a stack or canister. The replacement of such filters is often complex and time consuming, necessitating the requirement for additional tools.

Additionally, the replacement of current air cleaners is often complex, requiring the installer to maneuver within a confined space. The air cleaners generally comprise a felted mass of fibers, such as cotton, synthetic resins, or the like, thereby forming a mass.

Although the current air cleaners may adequately perform with respect to particulate removal, the replacement of air cleaners, as required in typical maintenance of equipment, is often difficult due to the aforementioned problems.

One of the current air cleaning devices is described in U.S. Pat. No. 6,361,574, issued on Mar. 26, 2002. The invention provides a filter canister with a filter mounted therein to filter air passing from an inlet end of the canister to an outlet end. The filter within the canister is formed of an outer cylindrical filter and an inner cylindrical filter mounted to the outlet wall of the canister to filter the pre-cleaned air that passes through an inlet opening of the canister into the air space between the interior of the canister and the outer filter.

While the aforementioned air cleaning apparatus adequately provides for removal and discharge of particulates from the intake air as well as thorough air filtering in a compact unit, the removal and replacement of the unit, as required in general maintenance, necessitates a number of additional tools, as well of a high degree of effort from the individual fulfilling the task.

An additional air cleaning apparatus is described in U.S. Pat. No. 5,935,281 issued on Aug. 10, 1999. The patent discloses an air filter having a housing defining a filter chamber, a fluid flow inlet opening to a first region of the filter chamber and a fluid flow outlet opening to a second region of the filter chamber. A filter element extends within the housing between the first region of the filter chamber for receiving unfiltered contaminated air and the second region of the filter chamber for receiving filtered air having passed through the filter element. Additionally, this includes an outer housing defining a filter chamber. The filter housing comprises a generally cylindrical body extending along a central axis and end closure members at the axially opposite ends of the body. The end closure members may both be detachably secured end caps, for example by threading, clamping or otherwise. Alternatively one of the two may be formed integrally with the body to provide a pot-like shaped housing having a detachable end cap at its open end.

The while the aforementioned disclosure recites an end closure member that is threaded, the filter element is not integral with the end closure element, but is merely disposed within the housing.

Presently, all known air cleaners require additional clips, bands, or even a separate housing to be attached to their respective receptacle.

Furthermore, many air cleaners require special tooling, and are particularly difficult to remove when attached to their respective receptacles within the associated apparatus.

It would be desirable to provide an air cleaner that has an integral coupling means, thereby allowing the air cleaner to be attached to an appropriate receptacle without requiring any additional clips or bands.

It would further be desirable to provide an air cleaner that is easily removable from its respective receptacle within the associated apparatus.

It would still further be desirable to provide an air cleaner wherein an essential component of said air cleaner serves to support the coupling means, thereby minimizing associated costs and increasing overall stability.

SUMMARY OF THE INVENTION

In view of the foregoing, it is an object of this invention to provide an air cleaner having an integral coupling means. Additionally, the integral coupling means allows the novel air cleaner to be mounted in the desired position without requiring any additional brackets or clips.

It is a further object of the present invention to provide an air cleaner wherein the coupling means is further supported by a rigid armature or support member to assure the integrity and overall stability of the coupling means when securely attached to a designated receptacle.

It is still a further object of the present invention to provide an air cleaner with an integral coupling means wherein an essential component of the air filter serves as the armature or support member for supporting said coupling means.

The present invention comprises a novel air cleaner having an inner mesh barrier. This inner mesh barrier comprises a plurality of openings and is generally cylindrical, having an inner mesh barrier inner surface and an inner mesh barrier outer surface. Furthermore, the air cleaner comprises an upper retaining segment and a lower retaining segment, and a filtration means, such as, for example, a felted mass of fibers, such as cotton, synthetic resins, or the like, thereby forming a mass. Typically, the upper retaining segment and the lower retaining segment serve to contain the filtration means and the inner mesh barrier.

The lower retaining segment of the air cleaner comprises an outer surface having an integral coupling means protruding outward there from. The integral coupling means of the present invention is generally molded from the same material as the lower segment of the air filter. Furthermore, the integral coupling means comprises an inner surface and an outer surface, wherein said outer surface of said integral coupling means comprises a plurality of threads for thereby attaching the air filter to a suitable device. Additional embodiments are contemplated wherein the inner surface of the coupling means is threaded, for coupling with an externally threaded receptacle.

BRIEF DESCRIPTION OF THE DRAWINGS

The invention as well as its features and advantages will become more apparent from the following description of a preferred embodiment of the invention and the accompanying drawings in which like numerals represent like parts.

DETAILED DESCRIPTION OF THE INVENTION

Figure 1:
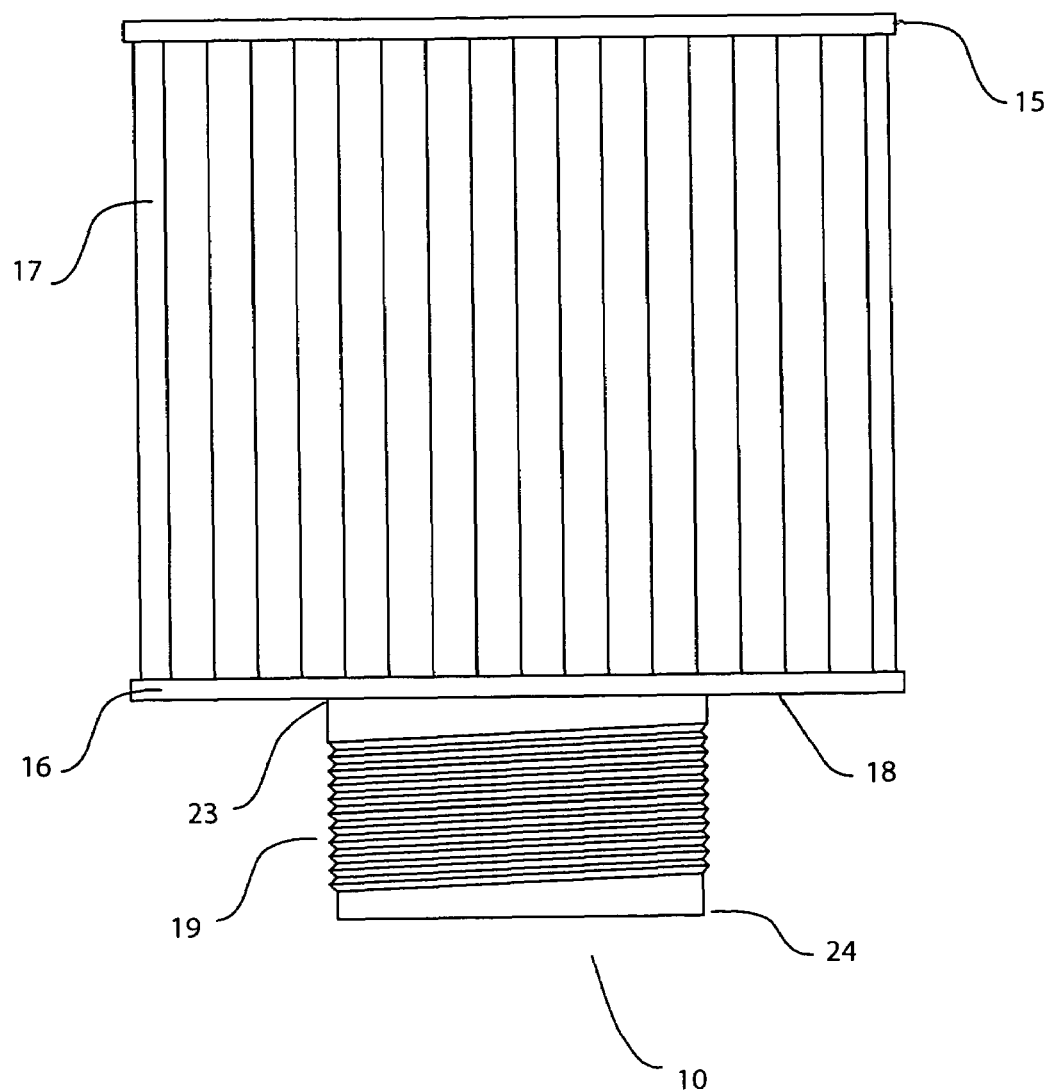
FIG. 1 is a side view of the air cleaner of the present invention.

Referring now to the figures, and particularly FIG. 1, a side view of the improved air cleaner 10 of the present invention is shown. The improved air cleaner 10 comprises an upper retaining segment 15, a lower retaining segment 16, and a filtration means 17. Generally, the filtration means 17 may be a felted mass of fibers, such as cotton, synthetic resins, or the like, thereby forming a mass. Typically, the upper retaining segment 15 and the lower retaining segment 16 serve to retain the filtration means 17, as well as the inner mesh barrier 11 (FIG. 2).

Furthermore, the lower retaining segment 16 of the air filter comprises an outer surface 18 having an integral coupling means 19 protruding outward there from. The integral coupling means 19 of the present invention is generally molded from the same material as the lower retaining segment 16 of the air cleaner. Additionally, a particular embodiment of the present invention is contemplated wherein the coupling means 19 and the lower retaining segment 16 of the air cleaner are integral, and molded from a urethane material, however any suitable material is within the scope of the invention. Furthermore, because the threads 22 are urethane, neither pipe thread sealant nor Teflon tape will be required to assure a positive seal.

Figure 2:
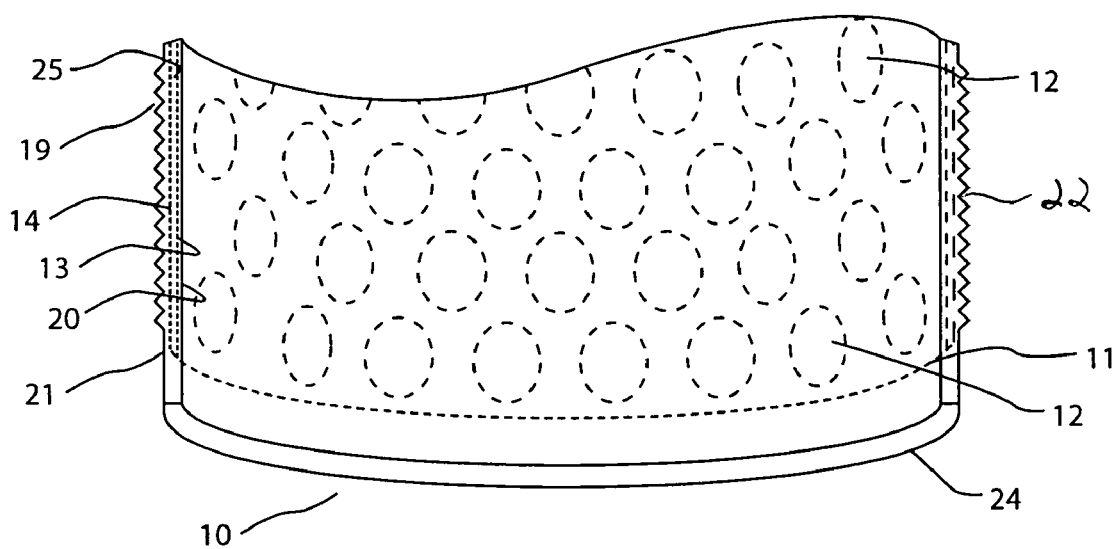
FIG. 2 is a partial cross-sectional view of the coupling means for the air cleaner of the present invention.
Figure 3:
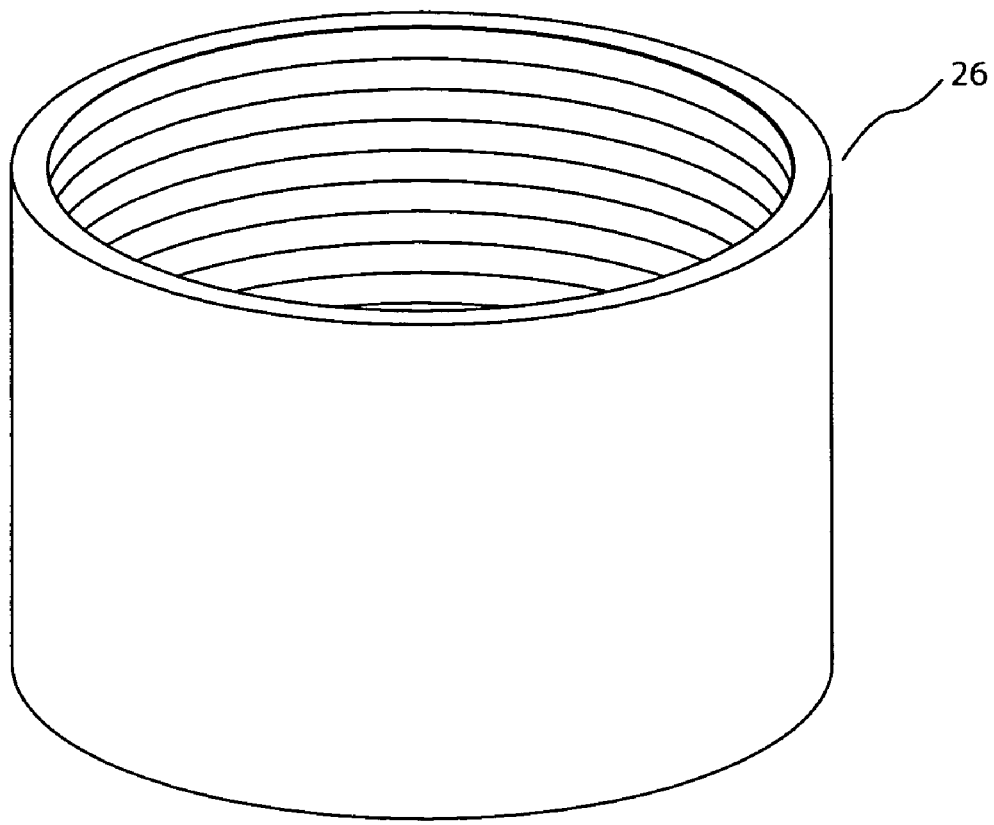
FIG. 3 is a partial elevated view of an internally threaded air cleaner receptacle.

Referring now to FIG. 2, a partial cross-sectional view of the coupling means 19 for the improved air cleaner 10 of the present invention is shown. The air cleaner 10 further comprises an inner mesh barrier 11. The inner mesh barrier 11 comprises a plurality of openings 12 and is generally cylindrical, having an inner mesh barrier inner surface 13 and an inner mesh barrier outer surface 14. The integral coupling means 19 comprises an inner surface 20 and an outer surface 21, wherein said outer surface 21 of said integral coupling means comprises a plurality of threads 22 for thereby attaching the air cleaner to a designated receptacle. Referring to FIG. 3, a partial view of an internally threaded air cleaner receptacle 26 is shown. While the embodiment described discloses an externally threaded coupling means, additional embodiments are contemplated wherein the inner surface of the coupling means is threaded, for coupling with an externally threaded air cleaner receptacle.

Referring again to FIG. 1 and FIG. 2, the coupling means 19 comprises a contiguous end 23 and a distal end 24, wherein said contiguous end 23 comprises an annular groove 25. The annular groove 25 of said contiguous end 23 of said coupling means 19 extends a distance toward the distal end 24 of said coupling means 19. Furthermore, said annular groove 25 of said contiguous end 23 of said coupling means 19 is appropriately sized to receive a portion of the inner mesh barrier 11. The inner mesh barrier 11 extends within said coupling means 11 toward said distal end 24 to thereby serve as an armature, or support member to firmly support plurality of threads 22 of the coupling means 19. In a particular embodiment of the present invention the inner mesh barrier 11 is comprised of a metallic material such as, for example, aluminum, however any material that will adequately serve as a mesh barrier, as well as the support member for the plurality of threads 22 may be used. Utilizing the inner mesh barrier 11 as a support the coupling means serves to provide rigid support for the coupling means thereby improving the overall integrity of the coupling means while minimizing the number of components utilized in the air cleaner 10.

The air cleaner of the present invention 10 is easily installed into a designated receptacle 26 without requiring any additional tools, brackets, or components. In operation, the air cleaner of the present invention 10 is coupled to a designated receptacle 26 simply by inserting the threaded coupling means 19 of the air cleaner into a designated internally threaded air cleaner receptacle 26, and rotating the air cleaner 10 until adequately secure within the receptacle 26. Additionally, when desired, the air cleaner of the present invention 10 may be removed from the receptacle 26 by rotating the air cleaner 10 in the opposite direction, until the threaded portion 22 of the coupling member 19 and the receptacle 26 disengage.

Figure 4:
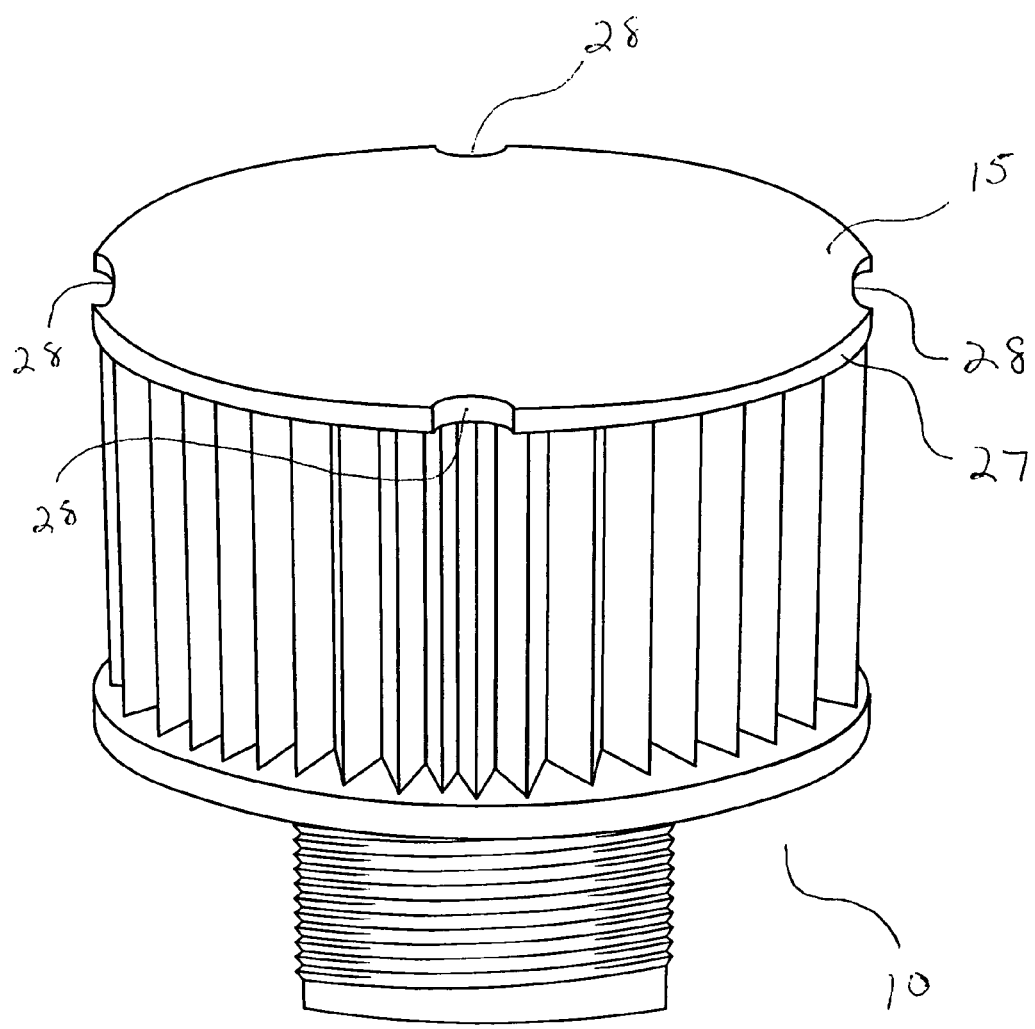
FIG. 4 is an elevated view of the air cleaner of the present invention having a gripping means.

Referring now to FIG. 4 a further embodiment of the present invention is illustrated. The upper retaining segment 15 further comprises an upper retaining segment outer rim 27, wherein said upper retaining segment outer rim 27 comprises a plurality of recesses or scallops 28. The scallops 28 are molded in the upper retaining segment 15, and serve to provide a gripping means making installation and removal of the improved air cleaner 10 less cumbersome. While the illustrated embodiment comprises four scallops 28, embodiments of the present invention having one or more scallops 28 are contemplated.

While this invention has been described as having particular embodiments, the present invention can be further modified within the spirit and scope of this disclosure. This application is therefore intended to cover any variations, uses, or adaptations of the present invention using the general principles disclosed herein.

What is claimed is:

1. An air cleaner comprising:
    a first retaining segment, a second retaining segment, and a filtration member;
    the filtration member having a first filtration member end and a second filtration member end, wherein the first filtration member end is engaged with the first retaining segment and the second filtration member end is engaged with the second retaining segment; and
    the second retaining segment further comprises an integral air cleaner coupling for coupling the air cleaner to an air cleaner receptacle, the air cleaner coupling including a distal end, a contiguous end and an inner surface including an annular groove extending partially between the contiguous end and the distal end; and
    the filtration member further comprising a support member inserted in the annular groove.

2. The air cleaner of claim 1, wherein the outer surface of the air cleaner coupling includes a threaded portion.

3. The air cleaner of claim 2, wherein the threaded portion of the air cleaner coupling is removably attachable to a threaded air cleaner receptacle.

4. The air cleaner of claim 1, wherein the support member further comprises an inner filter mesh barrier.

5. The air cleaner of claim 4, wherein the inner filter mesh barrier is comprised of metal.

6. The air cleaner of claim 1, wherein the second retaining segment and the air cleaner coupling include urethane.

7. The air cleaner of claim 1, wherein the first retaining segment further comprises a gripper.

8. The air cleaner of claim 7, wherein the gripper further comprises a plurality of scallops on an outer surface of the first retaining segment.

* * * * *